Aug. 24, 1965 J. L. PRATT, JR., ETAL 3,202,070
DIAZOTYPE COPYING APPARATUS
Filed Nov. 15, 1962 2 Sheets-Sheet 1

INVENTOR.
JAMES L. PRATT JR.
DONALD W. GOULDSMITH
BY Henry W Coughlin
Frederick S Gaulbre Aug. 24, 1965 J. L. PRATT, JR., ETAL 3,202,070

DIAZOTYPE COPYING APPARATUS

Filed Nov. 15, 1962 2 Sheets-Sheet 2

INVENTOR
JAMES L. PRATT JR.
DONALD W. GOULDSMITH

BY

ATTORNEY

United States Patent Office 3,202,070
Patented Aug. 24, 1965

3,202,070
DIAZOTYPE COPYING APPARATUS
James L. Pratt, Jr., Binghamton, and Donald W. Gouldsmith, Vestal, N.Y., assignors to General Aniline & Film Corporation, New York, N.Y., a corporation of Delaware
Filed Nov. 15, 1962, Ser. No. 237,963
2 Claims. (Cl. 95—73)

This invention relates to photocopying apparatus and, more particularly, to apparatus utilizing diazo-sensitized copy materials.

Diazotype printing and developing machines are widely used in duplicating of drawings or other translucent graphic originals and have the advantage of providing a direct positive copy which can be used without further processing or drying. Such machines generally utilize a translucent printing cylinder containing a high-intensity mercury vapor lamp. The original in contact with the diazo-sensitized sheet material is conveyed around the cylinder for the purpose of exposure to the radiation of the mercury vapor lamp.

It is to be noted that diazo-sensitized materials are actinically sensitive to spectral energy in the ultraviolet, or U.V., range. For this reason, mercury vapor lamps are used inasmuch as they contain in their radiation range, approximately 30% ultraviolet, 20% visible and 50% infrared. Only marginal portions of the visible and none of the infrared radiation are of any use in the exposure of the diazotype material. However, these radiations accompany the useful ultraviolet portion and represent a waste of considerable energy manifesting itself in the production of heat, which must be dissipated. For this reason, elaborate cooling systems must be provided in diazo reproduction apparatus, particularly for the cooling of the conventional printing cylinder which houses the source of radiation; namely, the mercury vapor lamp.

It is, accordingly, the primary object of this invention to increase the efficiency of the exposure apparatus utilizing a source of ultraviolet radiation, such as a mercury vapor lamp.

It is a further object of this invention to increase the efficiency of the cooling system combined with the exposure unit of the apparatus.

In the attainment of the objects, means are provided for filtering and directing the useful radiation of the spectral energy of such lamps to irradiate the sensitized material and correspondingly, means are provided for preventing the unwanted radiation from reaching the material and directing this portion of the spectrum to a cooling system.

It is a particular feature of this invention that the curved exposure surface presented by the conventional printing cylinder with its concomitant disadvantages, is replaced by a substantially flat transparent platen.

Other objects and features will be apparent from the following description of the invention, pointed out in particularity in the appended claims, and taken in connection with the accompanying drawings in which:

Figure 1:
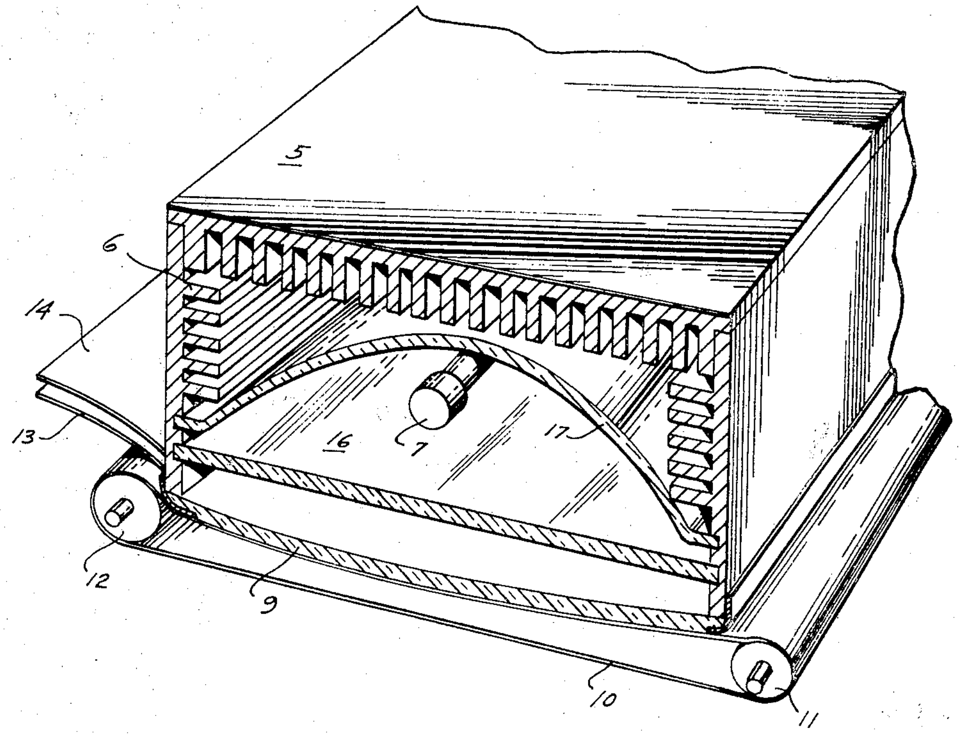
FIG. 1 is a simplified schematic perspective view of the combined exposure and cooling unit.

Referring to the figures, the apparatus shown, by way of example, in FIG. 1, comprises a housing 5 of heat-conducting material, preferably aluminum, the inner walls thereof being slotted to provide cooling fins 6. Within the housing 5 is placed the exposure lamp 7, which is of the high-intensity mercury vapor type. The bottoms of housing 5 consists of the exposure platen 9, which is preferably made of glass of the type transmissive to the ultraviolet radiation of the spectrum. A conveyor belt 10 placed around rollers 11 and 12 is so arranged as to be in contact with the bottom surface of the platen 9. Suitable motor means, not shown here, are provided for driving one of the rollers 11, or 12, to pass the sensitized material 13 in contact with the original 14 to be copied as a two-ply assembly under platen 9.

Figure 2:
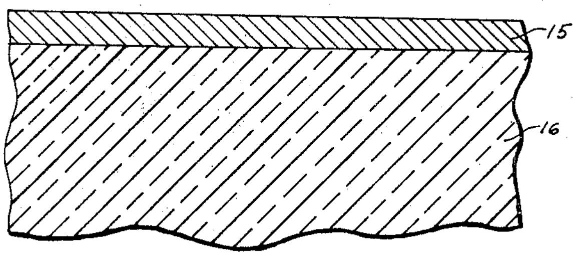
FIG. 2 is an enlarged cross-sectional view of the filter plate as used in the exposure and cooling unit.

Within the housing 5, and extending over the platen 9, is a filter plate 16 and extending between the side walls of the housing 5, is a parabolic reflector 17, the lamp 7 being located in the focal point thereof. The construction of the filter plate 16, as shown in the greatly enlarged cross-sectional view of FIG. 2, is of special significance in the operation of the exposure unit. Filter plate 16, as well as the exposure platen 9, are made of glass of the type which transmit ultraviolet radiation; as for example, high silica or lime soda glass. The filter plate 16, in addition, has a particular coating 15 on the top or bottom surface, or both, which permits free passage of ultraviolet radiation, but reflects the infrared portion of the spectrum. Such a dichroic coating is known as a multilayer optical interference coating and is applied by vacuum deposition methods. It consists of alternate layers of materials of high and low refractive index and having a thickness of about one-quarter of wavelength of the light. These are commercially available in various properties of spectral reflectivity and transmissivity. For example, the filter plate 16, having the above desired properties, may be made of glass with a multi-layer optical interference coating thereon as described above.

The reflector 17, on the other hand, is made of glass with a special dichroic multi-layer interference coating on either, or both sides thereof, which strongly reflects ultraviolet radiation, but allows the free passage of the unwanted portion, particularly, the infrared rays.

In fact, both the filter plate 16 and the reflector 17, perform the function of dichroic filters to separate the useful radiation and direct it to the sensitized material for exposure and to reflect the unwanted portion of the spectrum, particularly the infrared rays and direct these to the cooling chamber. As mentioned before, the inner portion of this chamber is provided with cooling fins 6, which in addition, are coated with a strongly absorptive temperature-resistant black paint. A current of cool air is directed into the space above the filter plate 16 so as to cool the mercury vapor lamp 7, as well as the fin structure, which absorbed the infrared radiation. In larger printing units, it is also advantageous to force cool air to circulate in the space between the platen 9 and the filter plate 16 in order to prevent overheating of the platen 9, which is in contact with the original and the sensitized material.

Figure 3:
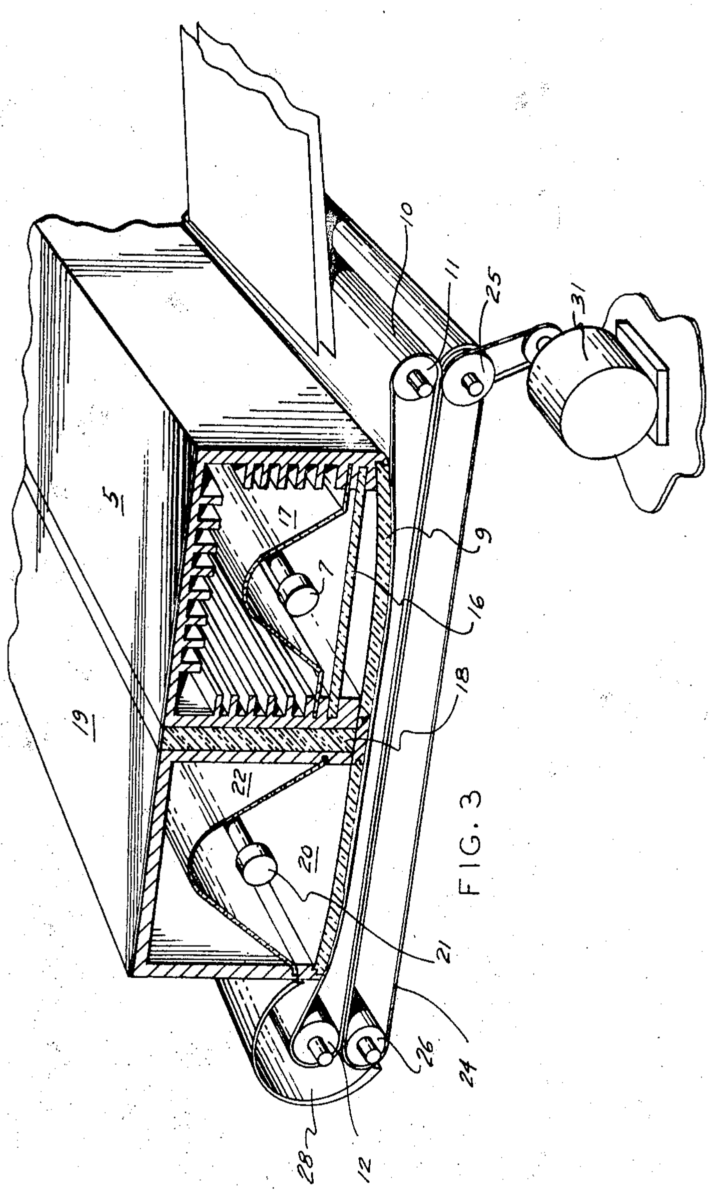
FIG. 3 is a combination exposure and developing assembly utilizing the principles of this invention for the processing of a particular diazotype material which can be developed by heat.

Referring to FIG. 3, the combination exposure and developing apparatus consists essentially of an exposure unit, similar in construction to the one described in connection with FIG. 1, and a heating or infrared applicator for the development of certain type diazo material which may be developed simply by the application of heat instead of the customary gaseous atmosphere containing ammonia vapor. This type of material may be in the form of foils or paper.

The developing portion comprises a housing 19, placed alongside the exposure housing 5. A separator 18 of suitable insulating material, such as fiberglass or rubber is provided between adjacent walls of the developing and exposure units to prevent heat exchange between them. A platen 20 attached to the housing 19, forms the bottom wall thereof and is similar in construction to the platen 9 of the exposure unit, except that it is made of such material which is strongly absorptive of infrared radiation, such as heavy lead glass, ceramic, aluminum or copper. Within the housing 19 is placed an infrared radiator 21, which may be in the form of a sheathed tubular electrical heater, and located in the focal point of a parabolic reflector 22 made of such material which reflects infrared radiation, as for example, aluminum.

A conveyor belt system consisting of an upper belt 10 over rollers 11 and 12 and in contact with the platens 9 and 20 is shown, by way of example, for passing the original and copy material over the exposure and developing assembly. A second conveyor belt 24 is arranged over rollers 25 and 26 and in contact with the belt 10 for returning the finished developed copy and the original to the front of the assembly. For this purpose, there is shown a curved deflector plate 28 arranged so that as the original and sensitized material pass the developing unit, they are constrained by the deflector plate 28 to pass around roller 12 and between coengaging surfaces of the belts 10 and 24. A motor 31, coupled to roller 25, illustrates the drive for the belt assembly.

Referring to the operation of the exposure device of FIG. 1, or the combined exposure and developing assembly shown in FIG. 3, a translucent graphic original 14 in contact with a diazo-sensitized copy material 13 is placed over the belt 10, whereby it is passed under the platen 9. The dichroic filter elements comprising the filter plate 16 and the reflector 17, cooperate in passing and directing, respectively, substantially all the available ultraviolet radiation from the lamp 7 onto the exposure platen 9, so as to irradiate the original and thus expose the diazo material. The infrared portion being reflected from the filter plate 16 and passed through the reflector 17 is dissipated in the form of heat, which is removed by the cool air. The combined action of the dichroic materials increases the efficiency of the exposure unit in that the available ultraviolet energy is concentrated for the exposure of the sensitized material and the infrared portion is reflected for better dissipation in the cooling chamber.

For the so-called dry-diazo, or thermo-diazo materials, the construction shown in FIG. 3 is particularly advantageous.

As the exposed diazo-sensitized sheet material in contact with the graphic original is passed by the conveyor belt under the platen 20 of the developing unit, it is subjected to the concentrated infrared radiation. Since this radiation impinges on the backside of the original, it will be more absorbed in the black areas thereof than in the white portions. Consequently, a differential heating is produced imagewise which enhances the heat developing of the diazo material in the same manner. The result is a sharp contrasting heat development of the latent image.

In smaller apparatus, the filter plate 16, may be eliminated and the platen 9, being provided with the coating 15, will serve as a filter and material support as well.

What is claimed is:

1. In a photocopying apparatus particularly for the exposure of diazotype materials, a housing having top and side walls defining an enclosure of substantially oblong shape and having open ends adapted for the passage of air therethrough, a bottom wall for said housing of transparent material, a dichroic reflector of parabolic shape within said housing, said reflector having an interference filter coating for passing radiations of the infrared range, but reflecting radiations in the ultraviolet range, a tubular mercury arc lamp in the focal point of said reflector, a transparent glass plate between said lamp and said bottom wall, said plate having a coating of dichroic material forming an interference filter having the property of passing radiations in the ultraviolet range, but reflecting radiations in the infrared range, and a plurality of radiation fins on the inner wall of said housing for absorbing said reflected radiations.

2. In a photocopying apparatus particularly for the exposure of diazotype materials, a housing having a top and side walls defining an enclosure of substantially oblong shape and having open ends adapted for the passage of air therethrough, a bottom wall for said housing of transparent material, a dichroic reflector of parabolic shape within said housing, said reflector having an interference filter coating for passing radiations of the infrared range, but reflecting radiations in the ultraviolet range, a tubular mercury arc lamp in the focal point of said reflector, a transparent glass plate between said lamp and said bottom wall, said plate having a coating of dichroic material forming an interference filter having the property of passing radiations in the ultraviolet range, but reflecting radiations in the infrared range and a plurality of radiation fins on the inner wall of said housing for absorbing said reflected radiations, and conveyor belt means in contact with said bottom wall for passing diazo-sensitized materials for exposure.

References Cited by the Examiner

UNITED STATES PATENTS 2,552,185 5/51 Koch ------------------ 88—24

OTHER REFERENCES

Publication, Addendum: "Cold" Mirrors published in the August 1959 issue of International Projectionist, pages 14 and 20.

EVON C. BLUNK, *Primary Examiner.*